(12) United States Patent
Wojciechowski et al.

(10) Patent No.: US 6,418,609 B1
(45) Date of Patent: *Jul. 16, 2002

(54) FASTENER, DIE BUTTON AND METHOD OF INSTALLING A FASTENER INTO A PANEL

(75) Inventors: Stanley E. Wojciechowski, Canton; Gilbert C. Quick, Jr., Livonia, both of MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/640,256

(22) Filed: Aug. 16, 2000

Related U.S. Application Data

(63) Continuation of application No. 09/098,865, filed on Jun. 17, 1998, now abandoned.
(60) Provisional application No. 60/049,835, filed on Jun. 17, 1997.

(51) Int. Cl.[7] ................................................. B23P 11/00
(52) U.S. Cl. ..................... 29/432.1; 29/509; 411/107; 411/180
(58) Field of Search ........................ 29/432.1, 432.2, 29/505, 509, 515, 522.1; 411/179, 180, 107

(56) References Cited

U.S. PATENT DOCUMENTS

| | | |
|---|---|---|
| 3,127,919 A | 4/1964 | Swanstrom |
| 3,481,634 A | 12/1969 | Rondeau |
| 3,556,189 A | 1/1971 | Ernest |
| 3,770,037 A | 11/1973 | Ernest |
| 4,543,701 A | 10/1985 | Müller |
| 4,825,527 A | 5/1989 | Ladouceur |
| 5,199,837 A | 4/1993 | Goss |
| 5,208,974 A | 5/1993 | Sawdon et al. |
| D357,176 S | 4/1995 | Ernest et al. |
| 5,407,310 A | 4/1995 | Kassouni |
| 5,423,645 A | 6/1995 | Muller |
| 5,752,305 A * | 5/1998 | Cotterill et al. ............ 29/432.2 |
| 5,782,594 A | 7/1998 | Muller |
| 6,108,893 A * | 8/2000 | Wojciechowski et al. ..... 29/505 |
| 6,146,072 A * | 11/2000 | Muller ........................ 411/180 |

FOREIGN PATENT DOCUMENTS

| | | |
|---|---|---|
| GB | 1468150 | 3/1977 |

* cited by examiner

*Primary Examiner*—S. Thomas Hughes
*Assistant Examiner*—Jermie E. Cozart
(74) *Attorney, Agent, or Firm*—Howard & Howard

(57) ABSTRACT

The present invention discloses a non-piercing, non-shearing fastener, die button, fastener and panel assembly and method for installing the fastener. The fastener has a head with a barrel, the barrel defines a cavity or pocket. The barrel cavity receives a portion of the panel and panel is forced around the outer barrel wall to wrap panel material around the barrel to lock the fastener into the panel. The barrel also includes anti-rotation formations.

11 Claims, 4 Drawing Sheets

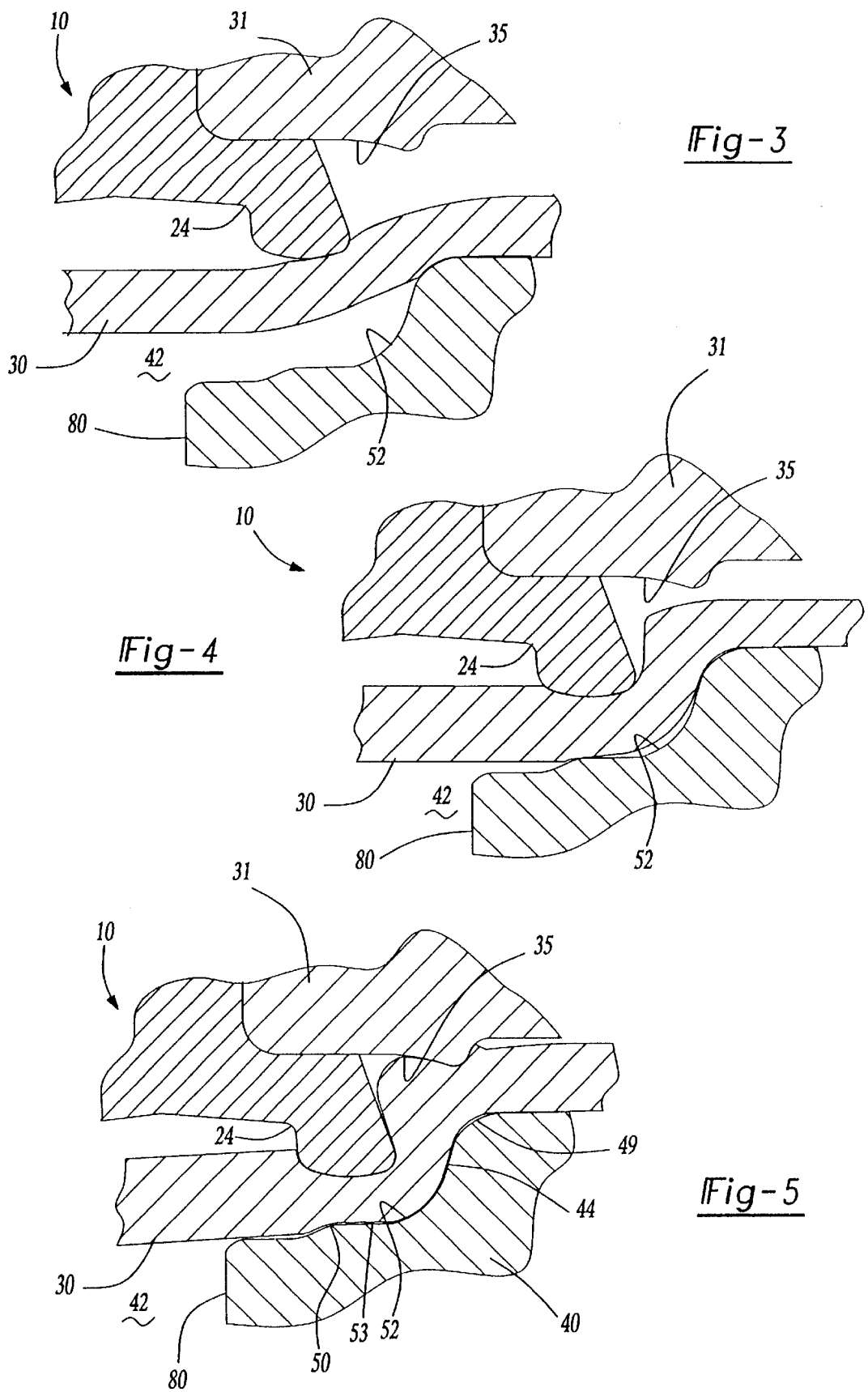

FASTENER, DIE BUTTON AND METHOD OF INSTALLING A FASTENER INTO A PANEL

BACKGROUND

This application is a continuation of Application Ser. No. 09/098,865 filed Jun. 17,1998 which is now abandoned, and claims priority of United States Provisional Application No. 60/049,835, filed Jun. 17, 1997.

The present invention relates to the installation of a flangeless, non-piercing fasteners into a workpiece, such as, for example, a sheet metal panel.

Typically, fasteners are installed into a panel by piercing the panel with the fastener and plastically deforming the fastener and panel together. The assignee of the present invention has numerous patents to pierce type fasteners, methods for installing such fasteners, die buttons relating to such installation, heads for installing such fasteners, etc. Although pierce type fasteners are very effective in a wide variety of applications, there are some applications that do not benefit from their use. Another method of installing fasteners is by welding the fastener to the panel, a so-called weld nut. This method also poses problems in certain applications.

One example of a "non-pierce," non-weld type installation is in a pan that is to retain a liquid. A specific example of such a "non-pierce," non-weld application is the mounting of an air conditioner compressor to the condensation pan of an air conditioner. If the pan is pierced by a pierce type fastener, the pan has to be sealed at the pierce point. This can be done, for example, by using special fluid tight fasteners, separate sealing materials, coatings, etc. However, the use of these alternative methods can be relatively expensive and add to the overall cost of the assembly. With weld nuts the same problem occurs because the weld nut must be placed in a pre-pierced hole for welding. Weld nuts have further disadvantages as well. They require a longer cycle time than either pierce or non-pierce fasteners, there is spatter from the weld, heat from the weld can adversely effect the base metal and increase the potential for cracking, they are expensive and have toxicity problems when applied to galvanized materials.

Another "non-pierce" and non-weld type installation is in pre-painted or coated panels. With pre-painted or coated panels, the piercing operation can adversely effect the paint or coating, particularly at the pierce point. The piercing of the panel creates exposed metal that can rust and must be treated to prevent rusting. By using a "non-piercing" fastener, there is no exposed metal and the integrity of the paint or coating is not disturbed. Weld nuts cannot be welded to painted materials rendering them fairly useless unless the surface area is cleared of paint. This would be an expensive, time consuming process which would still have exposed surface area.

BRIEF SUMMARY OF THE INVENTION

The present invention provides a solution to the above disadvantages that occur when using pierce type fasteners in the situations outlined. The present invention discloses a non-pierce type fastener, a die button, a method for attaching the non-pierce fastener to a workpiece, and an assembly having the non-pierce fastener and workpiece to provide a strong assembly without the disadvantages of piercing.

The fastener of the present invention has an attachment portion for connecting the fastener to another member, such as a panel. The attachment portion is disclosed as a threaded shaft that can receive a standard nut. A connecting head extends from the attachment portion. The connecting head is defined by a drive shoulder which is adapted to be engaged by a plunger of an installation head. The drive shoulder extends outwardly from and generally perpendicular to the attachment portion. A barrel extends at an angle from the drive shoulder and is adapted to engage and interlock with the workpiece. The barrel has a sidewalk extending from the drive shoulder which ends in a surface engaging end face. The surface engaging end face engages the panel and deforms the panel about the barrel to lock the fastener to the panel. The sidewalk has an outer surface and an inner surface and the connecting head includes a base surface opposite the drive Surface. The inner surface and the base Surface define an inner recess area or pocket that is adapted to receive a portion of the panel upon installation of the fastener.

In one embodiment of the invention, the fastener includes a retention groove located between the base surface and along the inner Surface of the sidewalk. Preferably, the retention groove is located at the juncture of the base surface and the sidewalk. The retention groove provides additional retention between the panel and the fastener when the panel is wrapped around the barrel of the fastener.

In the preferred embodiment, the barrel is flared outwardly with respect to the longitudinal centerline of the fastener in the form of a truncated cone. Preferably, it is flared at a minimum of 20° from vertical.

The barrel of the preferred embodiment has a flat wide face for contacting the panel surface. This provides a large surface area to engage the panel and not pierce the panel. This surface area also allows the barrel face and the panel to slightly slide relative to one another so that the panel is not sheared by installation forces. The outer and inner edges of the barrel are rounded to provide a smooth edge surface to prevent piercing or shearing of the panel during installation.

The preferred fastener also includes anti-rotation means to prevent the fastener from rotating with respect to the workpiece when installed. Preferably, the anti-rotation means are located along the inner surface of the barrel. In one embodiment, the fastener anti-rotation means are protrusions positioned about the barrel. In another embodiment, the fastener anti-rotation means are indents positioned about the barrel. The fastener could also have indents and protrusions.

The method of attaching the fastener to a workpiece includes the steps of positioning the workpiece between the die button and the fastener and driving the fastener into the workpiece to initially engage the barrel of the fastener against the workpiece and deform the workpiece into the recessed portion of a die button. This places an area of the workpiece in tension. It should be appreciated that the barrel is not deformed during the installation process, unlike pierce type fasteners. The fastener is driven further into the workpiece to thin the workpiece adjacent the barrel. The workpiece is trapped between the barrel outer edge and a transition surface in the die button. Between these two points the workpiece is in tension and stretched.

As the fastener is driven further into the workpiece, the forces on the same portion of the workpiece are reversed from tensile forces to compressive forces which squeezes the workpiece adjacent the transition surface and pushes the workpiece against the barrel. This reversal is caused by the workpiece being bottomed into the die cavity and the plunger deforming the top surface of the workpiece. As the workpiece bottoms into the die button, the barrel edge is still being driven into the panel which causes the workpiece metal to be pushed around the edge of the barrel. Simultaneously, the plunger is deforming the workpiece in the direction of the die bottom causing metal to move in the direction of the bottom and forcing the metal between the edge and the plunger to flow into the recess between the plunger and the outer surface of the sidewalk. The transition surface of the die button directs the flowing metal into the recess and assists in packing it about the outer surface of the sidewalk. The bottom of the die button assists as well.

The installation process is completed by finally driving the fastener home to lock the fastener into the workpiece. The inner pocket of the barrel receives the workpiece as it is forced into the pocket when the fastener is finally driven into the workpiece. The workpiece can also be forced into the retention groove if provided to further lock the fastener to the workpiece. This wraps the workpiece around the edge and face of the barrel and into the retention groove. In tile preferred embodiment, the panel is thicker than the depth of the pocket to further assist in packing of metal into the pocket and if provided the groove.

The die button that is used has a top surface with a cavity formed into it. The cavity is defined by an inner wall surface and a bottom surface. The inner wall surface has a transition surface that is generally adjacent the recess between the outer surface and tile plunger of the fastener. The transition surface is located between the top surface of the die button and the bottom of the cavity. The transition surface allows the panel to be bent and drawn during the initial installation step and then compressed as the installation is completed. In the disclosed embodiment of the die button, the wall has a first sloping section that ends at the transition surface and a second sloping section that has a greater slope than the first. This second section terminates in a radiused corner which ends in a slightly inclined surface. The inclined surface ends in a rounded protrusion. The inclined surface is stepped and ends in the bottom surface of the cavity. The die button is also disclosed with a vent hole to prevent the workpiece from being locked in the die button, for example by hydraulics created during the installation process.

The resulting fastener and panel assembly provides an assembly with good pull-out characteristics and no pierced openings. The assembly includes the fastener having a connector for connecting the fastener to another member and the panel engaging head at one end of the connector with its barrel. The panel has the formed recess into which the fastener is locked. The recess is partially defined by a wall and non-pierced base. The wall has a formed recess having a shape generally complementary to the shape of the barrel and pocket so that the recess generally mates with the barrel and is locked around the barrel.

Other advantages and meritorious features of the present invention will become more fully understood from the following description of the preferred embodiments, the appended claims and the drawings, a brief description of which follows.

DESCRIPTION OF THE DRAWINGS

FIGS. 2 through 6 illustrate a cut away view of the fastener and die button of the present invention and the progression of the fastener and the panel as the fastener is installed into the panel material.

DETAILED DESCRIPTION OF THE INVENTION

Figure 1:
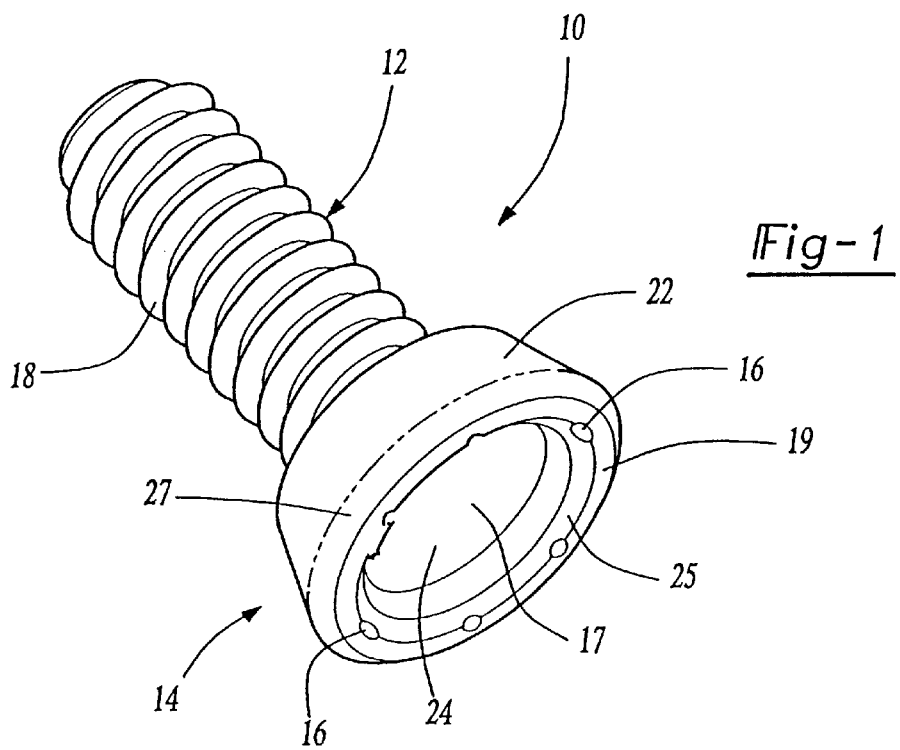
FIG. 1 is a perspective view of the fasteners of the present invention.

With reference to figure 1, the fastener of the present invention is illustrated generally at 10. The fastener 10 is made of cold header quality low to mid-range carbon steel, but could be made of other materials, such as, for example, stainless steel. The fastener 10 is illustrated as a fastener portion shown as a stud having a shaft portion 12 and a head portion 14. In the illustrated fastener 10, the stud has a threaded shaft 18. The use of threads and the type of threads will depend upon the application.

The head portion 14 includes a barrel 22 which extends from the fastener portion 12. The barrel 22 is flared outwardly away from the longitudinal centerline of the fastener and ends in a contact face 19 with curved or rounded edge 25 and 27. In the preferred embodiment, the barrel is sloped at a minimum of 20° from the centerline. The barrel 22 defines a retention recess or pocket 24 between the bottom 17 of the barrel 22 and the face 19 of the barrel 22. This retention recess 24 receives the panel and assists in locking the fastener 10 to the panel. This will be discussed in greater detail below.

Figure 9:
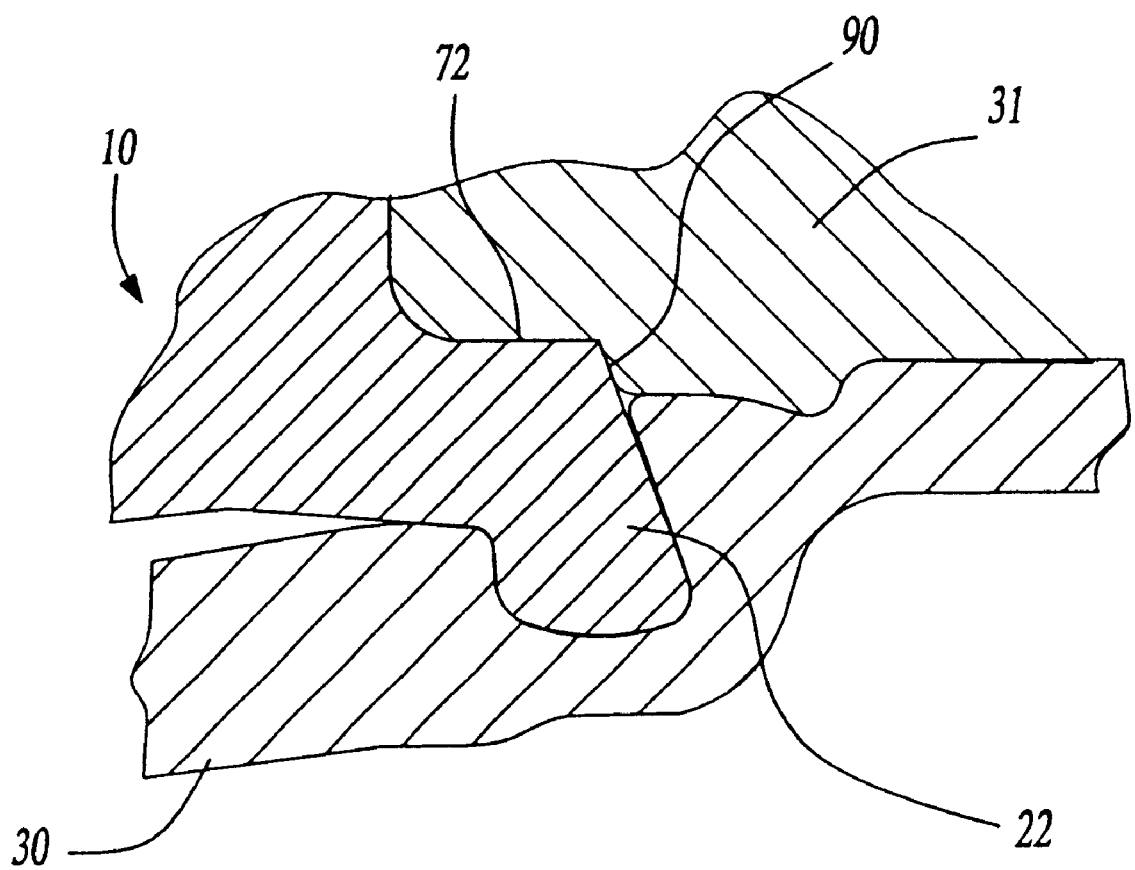
FIG. 9 illustrates a partial view of a further embodiment of the plunger of the present invention.

In the disclosed embodiment, anti-rotation formations 16 are provided to prevent rotation of the fastener 10 with respect to the panel after the stud is installed. Other anti-rotation means are available. The anti-rotation formations 16 are shown as indents, but could be protrusions as well, as shown in FIG. 9.

In the disclosed embodiment, formations 16 are uniformly dispersed around the inner wall of the barrel 22 to provide resistance to rotation of the fastener 10 to the panel 30 when the fastener 10 is installed.

Figure 2:
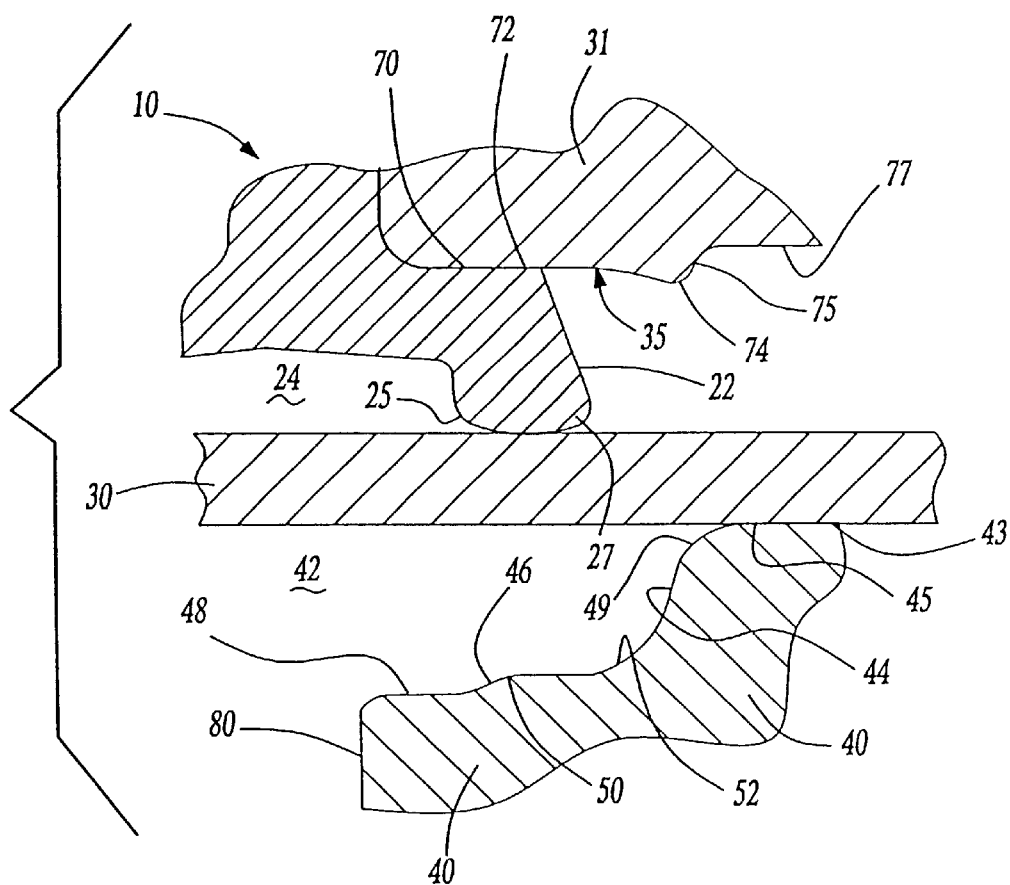
Figure 6:
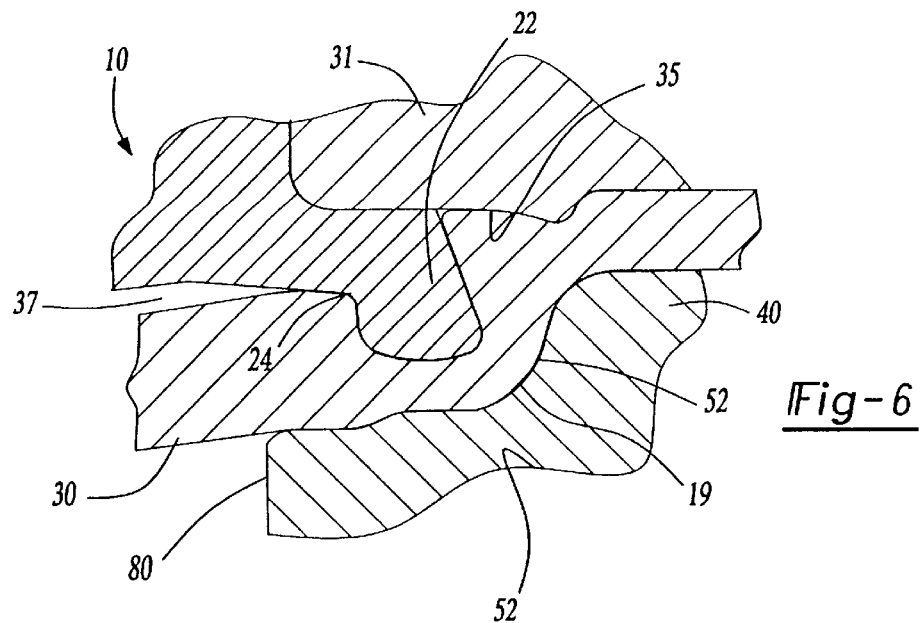
Figure 7:
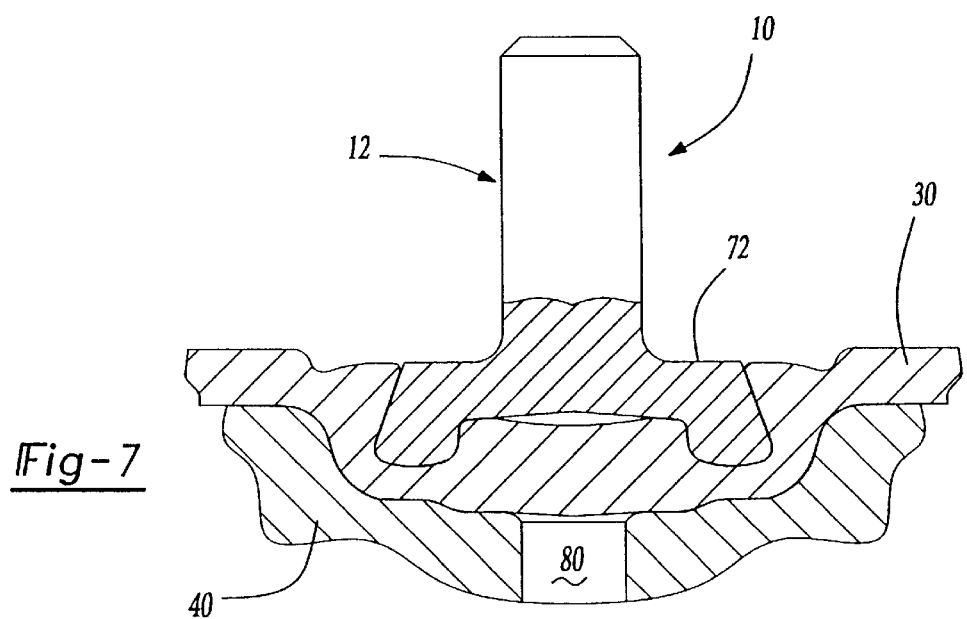
FIG. 7 is a cut away view of the installed fastener, panel, and die button.

With reference to FIG. 2, the die button of the present invention will be described. FIG. 2 illustrates a partial cut-away view of the plunger 31, fastener 10 and die button 40. The die button is generally shown at 40. The button 40 has a cavity 42 which is defined by an inner wall surface and a bottom surface 48. The inner wall surface is defined by a first wall section 45, a second wall section 44 and a third wall section 46 that are separated by transition surfaces 49 and 50. As illustrated, the first wall section 45 is sloped but at less than the slope of the second wall section 44. The first wall section 45 is sloped less than the third wall section 46 as well. It can also be seen that the transition surfaces 49 and 50 are rounded and the intersection of the second wall section 44 and the inclined surface 53 is a radiused surface 52. The different slopes between wall sections 44 and 46 facilitate the initial stretching of the workpiece 30 and the following compression. The rounded surfaces also facilitate this reversal of the forces applied to the workpiece 30 and are rounded to prevent piercing or shearing of the workpiece 30. The third wall section 46 provides a stepped section to bottom surface 48. This step allows panel metal to flow between the transition 50 and surface 48. In the preferred embodiment, the panel 30 is thicker than the depth of pocket 24 to ensure packing of metal into the pocket 24. Since there is extra metal, due to the depth of pocket 24, this metal can flow into the area between bottom 48 and transition 50.

This die button also illustrates the use of a central bore 80. This bore 80 is used in the die button to prevent the panel or workpiece from being locked in the die button. Bore 80 prevents hydraulic interaction between the panel or workpiece and the die button so that the panel can be easily removed from the die button.

The installation of the fastener 10 into a panel 30 will be described with reference to FIGS. 2 through 7. It should be appreciated by those of ordinary skill in the art that an installation head having a plunger 31, which is partially shown in FIGS. 2 through 7, is used to install the fastener 10 into a panel 30.

Initially, the face 19 of the barrel 22 contacts the panel 30. As the plunger 31 proceeds through its stroke, the fastener deforms tile panel 30 elastically into the cavity 42 of die button 40. The fastener deforms the panel 30 elastically to the point that the load transfer from the outer edge 27 of barrel 22 to the panel 30 begins to plastically deform the panel 30. This is illustrated in FIG. 3. The fastener continues to plastically deform the panel 30 thinning the panel in the area of the outer edge 27 of the barrel 22 until the plunger 31 contacts the panel 30. At this stage, there is a tensile strain created in the panel. The panel 30 is bent over the transition surface 49 and stretched by the barrel 22.

With reference to FIG. 4, plunger 31 begins to engage panel 30 and panel 30 has bottomed out on the transition surface 50. The plunger 31 from this point to the end of the installation cycle, plastically offsets the sheet steel it comes into contact with forcing material into area 20. The plastic deformation of the panel 30 caused by the outer edge 27 of the barrel 22 through this segment of tile installation cycle reverses the strained condition from tensile to compression. This is shown in FIGS. 4 and 5. Further, as shown in FIG. 4, the barrel 22 is forcing the panel 30 into the corner 52 between the wall 44 and surface 53. Still further, as shown in FIG. 4, the panel 30 is beginning to be forced into the recess 24 of the barrel 22.

During the final fraction of a millimeter of stroke in the installation cycle, the panel between the face of the barrel and the region 52 of the cavity 42 of die button 40 is plastically displaced radially outward directing additional material around the outer edge of the barrel 22 and into the recess 24 of the fastener 10 ensuring optimum retention fill. This is illustrated in FIG. 5. Additionally, the panel 30 is forced further into recess 24 by transition surface 50 and bottom surface 48 to wrap the panel 30 about the barrel 22.

Figure 8:
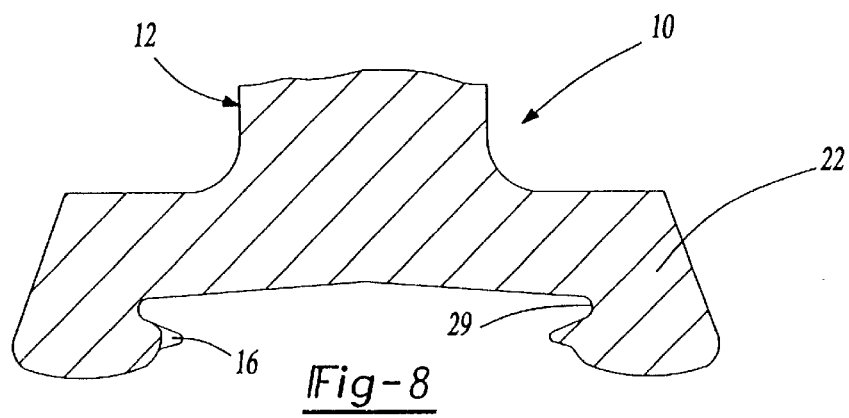
FIG. 8 illustrates a further embodiment of the fasteners of the present invention with the retention groove and locking protrusion.

The transition area 50 and the inside edge 25 of barrel 22 squeeze the panel 30 to force metal to flow around the barrel 22. The panel 30 being bottomed on bottom surface 48 and the metal flow squeezes metal into the formations 16 to further lock the fastener to the panel. With reference to FIG. 8, the groove 29 provides further retention of the fastener to the panel. It should be appreciated that groove 29 could be a series of grooves, notches, or a continuous groove. Preferably the groove 29 is undercut to provide greater retention.

As shown in FIGS. 2 through 5, the plunger 31 has a profiled end face 35. The end face 35 has an engaging surface 70 for engaging the shoulder 72 of the fastener 10. The engaging surface 70 terminates in a panel engaging edge 74. In the preferred embodiment, the end face 35 is angled adjacent the edge 74 to facilitate the engagement of the edge 74 with the panel 30. The angled edges 74 assist in forcing the panel metal 30 toward the barrel 22 and into the recess 20. This flow of metal wraps around the outer sidewalk of the barrel 22 to lock the fastener 10 into the panel 30. The plunger includes a stepped portion 75 and ends in surface 77.

With reference to FIG. 9, a further embodiment of the plunger 31 is illustrated. In this embodiment, the fastener 10 is larger than the fastener 10 of previous embodiments. To compensate for the larger size of fastener 10, the plunger includes a step 90 which receives the engagement shoulder 72. As illustrated, the barrel 22 is partially received within the step 90. Since a portion of barrel 22 is received within the step 90, the barrel does not extend as far into the panel. In this embodiment, the shoulder 72 is generally flush with the surface of the non-deformed panel 30, in contrast to the earlier embodiments in which the shoulder 72 is below the surface of the non-deformed panel 30.

It is anticipated that this fastener and method will be used primarily in thin walled panels, such as sheet metal, but other workpieces could be used. It should be appreciated by those of ordinary skill in the art that the dimensions of the die button and fastener will vary depending upon the application. Although the exact dimensions of the fastener, die button and panel will vary, in the preferred embodiment, the pocket 24 has a depth which is less than the thickness of panel 30.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

What is claimed is:

1. A method for attaching a fastener to a workpiece, said method comprising the steps of:

providing a workpiece;

providing a fastener having a barrel;

providing an installation mechanism having a plunger for driving said fastener into said workpiece without piercing said workpiece;

providing a die button having a recessed portion defined by at least a wall and a bottom for controlling the deformation of said workpiece as said fastener is driven into said workpiece;

inserting a fastener into said plunger of said installation mechanism;

positioning said workpiece between said die button and said fastener;

driving said fastener into said workpiece to initially engage said barrel of said fastener against said workpiece and deform said workpiece into said recessed portion of said die button, placing the portion of said workpiece adjacent said barrel in tension;

continuing to drive said fastener against said workpiece to thin said portion of said workpiece adjacent said barrel;

continuing to drive said plunger into said workpiece as said workpiece engages said bottom of said die button and reversing the forces on said workpiece from tensile forces to compressive forces to squeeze said portion of said workpiece adjacent said barrel and push said portion of said workpiece adjacent said barrel about said barrel;

completing the installation by finally driving said fastener to fully form said workpiece about said barrel to lock said fastener into said workpiece.

2. The method of claim 1, further including the steps of providing said barrel with a pocket and an edge and forcing said barrel portion into said workpiece to thin said workpiece immediately adjacent said edge of said barrel and force said workpiece into said pocket and about said barrel.

3. The method of claim 2, further including the step of providing a retention groove in said barrel and forcing said workpiece into said groove as said fastener is finally driven into said workpiece.

4. The method of claim 3, wherein said groove is formed in said barrel adjacent said pocket.

5. The method of claim 3, further including the step of forming said workpiece adjacent said edge of said barrel around said edge.

6. The method of claim 1, further including the step of providing a pocket defined by said barrel and forcing said workpiece into said pocket as said fastener is finally driven into said workpiece.

7. The method of claim 1, further including the step of forming the workpiece adjacent said barrel around said barrel.

8. The method of claim 1, wherein said plunger is provided with a protruding edge, said method including the step of driving said protruding edge into said panel to force panel material along said barrel.

9. A method for attaching a fastener to a workpiece, said method comprising the steps of:

provinding a workpiece;

providing a fastener having a barrel;

providing said barrel with a pocket and an edge and a retention groove in said barrel;

providing an installation mechanism having a plunger for driving said fastener into said workpiece without piercing said workpiece;

providing a die button having a recessed portion defined by at least a wall and a bottom for controlling the deformation of said workpiece as said fastener is driven into said workpiece;

inserting a fastener into said plunger of said installation mechanism;

positioning said workpiece between said die button and said fastener;

driving said fastener into said workpiece to initially engage said barrel of said fastener against said workpiece and deform said workpiece into said recessed portion of said die button, placing the portion of said workpiece adjacent said barrel in tension;

continuing to drive said fastener against said workpiece to thin said portion of said workpiece adjacent said barrel;

forcing said barrel portion into said workpiece to thin said workpiece immediately adjacent said edge of said barrel and force said workpiece into said pocket and about said barrel continuing to drive said plunger into said workpiece and reversing the forces on said workpiece from tensile forces to compressive forces to squeeze said portion of said workpiece adjacent said barrel and push said portion of said workpiece adjacent said barrel about said barrel;

completing the installation by finally driving said fastener to fully form said workpiece about said barrel to lock said fastener into said workpiece and forcing said workpiece into said groove.

10. The method of claim 9, wherein said groove is formed in said barrel adjacent said pocket.

11. The method of claim 10, further including the step of forming said workpiece adjacent said edge of said barrel around said edge.

* * * * *